C. M. GREEN.
WIRELESS TELEGRAPHY.
APPLICATION FILED SEPT. 30, 1907.
996,580.
Patented June 27, 1911.
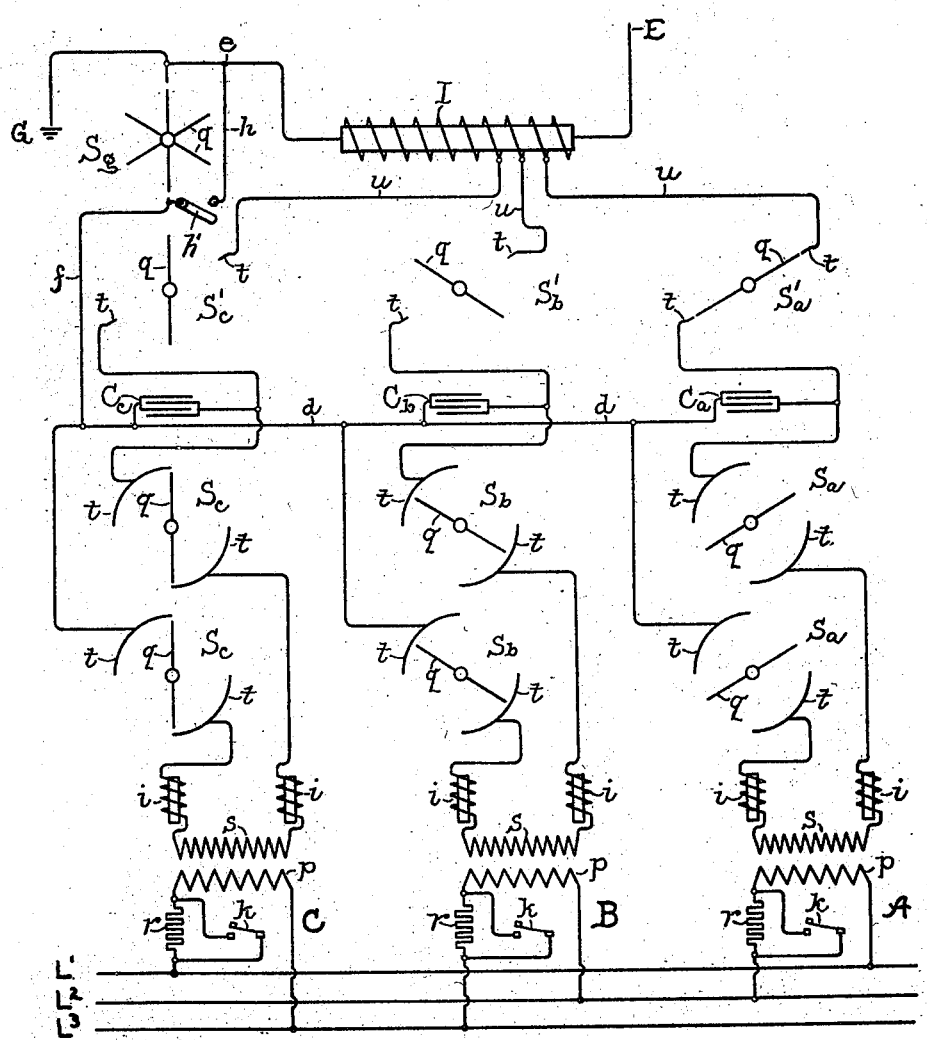
WITNESSES:
INVENTOR
CHARLES M. GREEN.
BY
ATT'Y.

UNITED STATES PATENT OFFICE.

CHARLES M. GREEN, OF LYNN, MASSACHUSETTS, ASSIGNOR TO GENERAL ELECTRIC COMPANY, A CORPORATION OF NEW YORK.

WIRELESS TELEGRAPHY.

996,580.  Specification of Letters Patent.  Patented June 27, 1911.

Application filed September 30, 1907. Serial No. 395,094.

*To all whom it may concern:*

Be it known that I, CHARLES M. GREEN, a citizen of the United States, residing at Lynn, county of Essex, State of Massachusetts, have invented certain new and useful Improvements in Wireless Telegraphy, of which the following is a specification.

My invention has reference to improvements in the method of and apparatus for wireless or space telegraphy, and it comprises a system of multiplex wireless telegraphy in which multiphase currents are employed for the charging of the condensers, by the discharge of which electromagnetic waves are started at an elevated conductor or antenna, which waves propagate through space and are absorbed at a distant station or stations by another elevated conductor or conductors, and there actuate selectively certain responsive devices for the production of signals.

The idea which underlies my invention is based upon the consideration that at a wireless telegraph transmitting station the electromagnetic waves by which messages are transmitted emanate from the antennæ only during the time of the rapidly diminishing, oscillating condenser discharges, which time is only a very small fraction of the duration of a half cycle of the alternating current which charges the condenser. If, therefore, a multiphase current is employed for charging a number of condensers, each phase may be diverted to and confined to a different condenser, and the time of charging and discharging each condenser may be controlled by independent transmitting keys and suitably timed conjugating or selector devices, whereby it becomes practicable to send as many independent messages from the same station as there are multiphase currents employed for the charging of the condensers. In a system of this character it is necessary to make certain that a phase of current which charges one condenser shall not, at the same time, charge any of the other condensers, and this selective joining of each current-phase with a distinct condenser is, in accordance with my invention, effected by certain devices which may be called selectors or conjugators. If, in a system of this character, two-phase currents are employed, the system will be a duplex telegraph; if a three-phase current is employed, the system becomes a triplex telegraph; and, generally, if $n$-phase currents are employed, the system becomes a multiplex telegraph.

In the accompanying drawing, which forms a part of this specification, I have illustrated in diagram an apparatus which may be used in the practice of my invention as applied to a triplex system of wireless telegraphy, but it will be obvious to those skilled in the art that the invention is applicable to the use of currents of any number of phases.

In this drawing, a three-phase system of electrical supply, represented by the conductors $L^1$, $L^2$, $L^3$, is tapped by the three transmitting circuits A, B, C, each containing the primary $p$ of a step-up transformer, a non-inductive resistance $r$, in series with the primary of the transformer, and a transmitting key $k$, shunting the resistance. The secondaries $s$ of the transformers are each in a circuit that includes two inductances $i$, $i$, two selector devices or conjugators $S_a$ $S_a$, or $S_b$ $S_b$, or $S_c$ $S_c$, and one of the condensers $C_a$, $C_b$, $C_c$, respectively, all in series. One armature of each condenser is connected with the like armature of the other condensers by the conductor $d$, and the other armatures of the condensers are connected each through a selector $S'_a$, $S'_b$, $S'_c$, respectively, with a reactance coil I. One end of this reactance coil is connected by a conductor $e$ with the ground at G, and at the other end with the elevated conductor E. In addition to this, the common terminal of one armature of the condensers, the conductor $d$, is also connected to ground by a conductor $f$ and a general selector or conjugator $S_g$.

Each conjugator consists of a rotating element $q$ and two stationary elements $t$. Except in the case of the conjugator $S_g$, the rotating element is a simple two-armed blade, rotating about an axis passing through its middle. In the case of the conjugator, $S_g$, the rotating element consists of three intersecting blades having their common axis of rotation at the point of intersection, as indicated; it has, therefore, six arms projecting radially from the center of rotation, while the other conjugators have only two such arms. In the case of the conjugators $S_a$, $S_b$, $S_c$, the stationary elements are curved metal strips, each extending through a quadrant of a circle; they are placed diametrically opposite each other, so that the rotary element will sweep past but close to the stationary elements during one half of each revolution. In the case of the other conjugators, the stationary elements have no appreciable width, but are reduced to a simple wire terminal or the edge of a strip of metal facing the edge of the rotating element. In all these selectors or conjugators the rotary element sweeps past the stationary elements so close that for the high potential charges or discharges which pass through these conjugators the circuits in which they are included are practically closed at the times when the rotary and stationary elements are in opposition.

Different points of the inductance coil I are connected each to one of the stationary elements of the conjugators $S'_a$, $S'_b$, $S'_c$, by the conductors $u$, and the points of connection at the inductance coil are selected in a manner which will be pointed out farther on. The inductance coil I is preferably constructed without magnetic core, because this coil, or a portion thereof, forms a part of a number of sonorous circuits, as will appear farther on, and the accurate tuning of such circuits in accordance with certain well known rules, is more reliable when no iron or other magnetic material is employed.

The rotors of the selectors or conjugators are all driven in synchronism with the periodicity of the multiphase current employed, and those belonging to the same transmitting station are displaced in space with reference to those belonging to another transmitting station by an angle corresponding to the time difference between the phases of the multiphase current employed. In the example illustrated in the drawing, where a three-phase current is employed, the rotors of the selectors of station B are displaced with reference to those of station A by an angle of 120°, and the rotors of the selectors of station C are displaced with reference to those of station B also by an angle of 120°, in the same direction. The rotor of the general selector $S_g$, having three intersecting, two-armed blades, has each of the three blades correspond in angular position to that of one set of station selectors, as is clearly seen in the drawing.

The synchronous rotation of the selector rotors may be effected in any desirable way, but is most accurately secured by suitably gearing the rotors to the rotor of the multiphase current generator. Actual physical contact between the rotors and stators of the selectors $S_a$, $S_b$, $C_c$, is preferably avoided, since I have found that with the employment of sufficiently high voltages such contact is not necessary, and the irregularities and the wear and tear due to physical contact are thereby avoided; but while this is the construction and mode of operation which I prefer, and while this is a feature of my invention, I am by no means restricted thereto, since it is practicable to make actual brush-contact between these rotors and stators.

In the case of the selectors $S'_a$, $S'_b$, $S'_c$, there must be no actual contact, for reasons which will appear farther on, but whether actual or virtual contact is employed at the selectors $S_a$, $S_b$, $S_c$, it is always true that, for the high voltages used in such system, a circuit is practically closed at the point or points where a rotor is in opposition to a stator or stators. Thus, for instance, in the momentary condition of the apparatus represented in the drawing, the secondary circuit of the step-up transformer for station A is open at the selectors $S_a$, $S_a$, while the circuit from the condenser $C_a$ at that station, to the inductance coil I is closed at the selector $S'_a$. Similarly, the secondary circuit of the step-up transformer for station B, is closed at the selectors $S_b$, $S_b$, while the circuit from the condenser at $C_b$ at that station, to the inductance coil I, is open at the selector $S'_b$. For station C the conditions of the circuits are the same as for station B, and the general selector $S_g$, in the condition shown in the drawing, closes the ground connection from the common condenser terminal $d$ by conductor $f$.

The mode of operation of the system, so far described, is readily understood. Let it be assumed that the rotors of the selectors are driven clock-wise and that three-phase current is established in the lines $L_1$, $L_2$, $L_3$. In that case, in the momentary condition of the apparatus shown in the drawing, the primary circuits take each one phase of current, but the secondary circuit of station A being open, its condenser $C_a$ receives no charge; but under the supposition that it has been charged at an earlier stage of the operation, it will now discharge in the circuit which includes the selector $S'_a$, conductor $u$, that portion of the inductance coil which is interposed between conductor $u$ and the general selector, the general selector itself, and the conductors $f$ and $d$. Each discharge determines a great difference of potential between the antenna and the earth, and the emission of electromagnetic waves from the antenna. The discharges are oscillating ones, the periodicity of which depends upon the capacity of the condenser and the inductance of the portion of the inductance coil in this circuit. The periodicity is determined in accordance with the well known expression $$T = 2\pi\sqrt{CL},$$

wherein T is the duration of the period, C the localized capacity, and L the localized inductance of the circuit. The frequency, $$\frac{1}{T},$$

of the oscillating discharges can thus be predetermined and is usually made rather great, several millions per second. By assigning to the three discharging circuits largely different frequencies, the frequencies and lengths of the electro-magnetic waves due to the operation of the three stations become correspondingly different, and may, therefore, be selectively absorbed by three distinct receiving circuits, which are tuned respectively in unison with the three discharging circuits, in accordance with the above formula.

The condensers can only be charged while the rotors of selectors $S_a$, $S_b$, $S_c$, respectively, are in virtual or actual contact with their stators, and the condensers can only discharge when the rotors of the selectors $S'_a$, $S'_b$, $S'_c$, respectively, are in virtual contact with their stators; provided that at such times the discharging circuit is closed at the general selector $S_g$. This is the reason why the rotor of the general selector has three two-armed blades, one of which always closes the circuit at this point whenever one of the discharging selectors ($S'_a$, $S'_b$, $S'_c$) is on closed circuit.

The use of the general selector is not absolutely necessary, since it is quite practicable to keep the discharging circuit at this point permanently closed, as by a wire $h$, and switch $h'$; but I prefer to use this general selector, whereby the condensers are cut off from the ground, except at the moment of discharge.

The resistances $r$, $r$, $r$, in the primary transmitting circuits are so large that these circuits take exceedingly little current so long as the keys are in the open position shown in the drawing, so that at such times the stations do practically no work, and the energy of the electromagnetic waves emanated by the antenna is so small that a distant receiver is not thereby actuated. When, however, a key is depressed, and thereby the resistance shunted, the corresponding primary circuit takes a large current and the station emits practically effective signals in accordance with the code employed.

Since each transmitter has control of one phase only of the multiphase current, to the exclusion of the other phases, and since the oscillating discharges ultimately produced by any transmitter have widely different frequencies from those produced by the other transmitters, it is clear that all the transmitters may work simultaneously without interference or merging of the signals; each operator can therefore work without regard to the others, and two, three or more independent messages may thus be transmitted simultaneously. Each message or signal is characterized by short groups of electromagnetic waves of a distinct and predetermined frequency. How these independent messages or signals can be selectively received at distant stations is well known to those skilled in the art, and need not be here described.

The frequency of the initial primary current need not be high, since with such low periodicity as 25 per second, each transmitter has control of the current twenty-five times per second, each time for $\frac{1}{75}$ of a second. This is ordinarily sufficient, but a much higher frequency may comfortably be employed.

In the use of this process by means of the apparatus described, the terminals of the rotors and stators of the discharging selectors, and the air gaps between them at the times of opposition, take the place of the ordinary air gap or discharging devices, and these terminals will, therefore, be made of a material suitable for this purpose. The same thing is true of the general selector, if such be used. The division of the air gap tends to prolong the useful life of these devices, and has other advantages.

While I have shown two inductance and two charging selectors for each transmitter, one only may be used if so desired, but it is preferable to use two, one in each side of the secondary circuit.

What I claim as new and desire to secure by Letters Patent of the United States, is:

1. The method of simultaneously transmitting two or more distinct wireless signals, which consists in causing the emission of two or more trains of electromagnetic waves of different periodicities in multiphase current time relation, and breaking each train independently into groups in accordance with a code.

2. The method of simultaneously transmitting two or more distinct wireless signals from a common antenna, which consists in impressing upon the latter two or more trains of electric potentials of different periodicities in multiphase current time relation, and breaking each train independently into groups in accordance with a code.

3. The method of transmitting wireless signals, which consists in establishing and maintaining the emission of periodic electromagnetic waves of ineffective volume, and reinforcing said waves in accordance with the desired signals.

4. The method of simultaneously transmitting two or more distinct wireless signals, which consists in establishing and maintaining the emission of two or more trains of electromagnetic waves in multiphase current time relation, each of a different frequency and all of ineffective volume, and independently reinforcing two or more of the trains, each in accordance with the desired signal.

5. The method of simultaneously transmitting two or more distinct wireless signals from the same antenna, which consists in charging two or more condensers selectively each by a different phase of a multiphase current and in code accordance with a different signal, discharging the different condensers each at a different frequency in the order and succession of the charges, and affecting a common antenna by each discharge.

6. A multiplex wireless telegraph transmitter, comprising means for simultaneously emitting two or more trains of electromagnetic waves of different periodicities in multiphase current time relation, and means for breaking each train independently into groups in accordance with a code.

7. A multiplex wireless telegraph transmitter, comprising an antenna and means for impressing upon the latter two or more trains of electric potentials of different periodicities in multiphase current time relation, and means for breaking each train independently into groups in accordance with a code.

8. A wireless telegraph transmitter, comprising means for establishing and maintaining periodic electromagnetic waves of ineffective volume, and means for reinforcing said waves in accordance with the desired signals.

9. A multiplex wireless telegraph transmitter, comprising means for establishing and maintaining two or more trains of electromagnetic waves in multiphase current time relation, each of a different frequency and all of ineffective volume, and means for independently reinforcing two or more of the trains, each in accordance with a desired signal.

10. A multiplex wireless telegraph transmitter station, comprising an antenna, two or more condensers, means for charging each condenser by a different phase of a multiphase current and each during code intervals corresponding to a different message, a differently tuned resonant discharging circuit for each condenser, and an antenna and ground connection common to all condensers.

In witness whereof, I have hereunto set my hand this 26th day of September, 1907.

CHARLES M. GREEN.

Witnesses:
JOHN A. McMANUS, Jr.,
ROBERT SHAND.

---

Copies of this patent may be obtained for five cents each, by addressing the "Commissioner of Patents, Washington, D. C."